Figure 1:
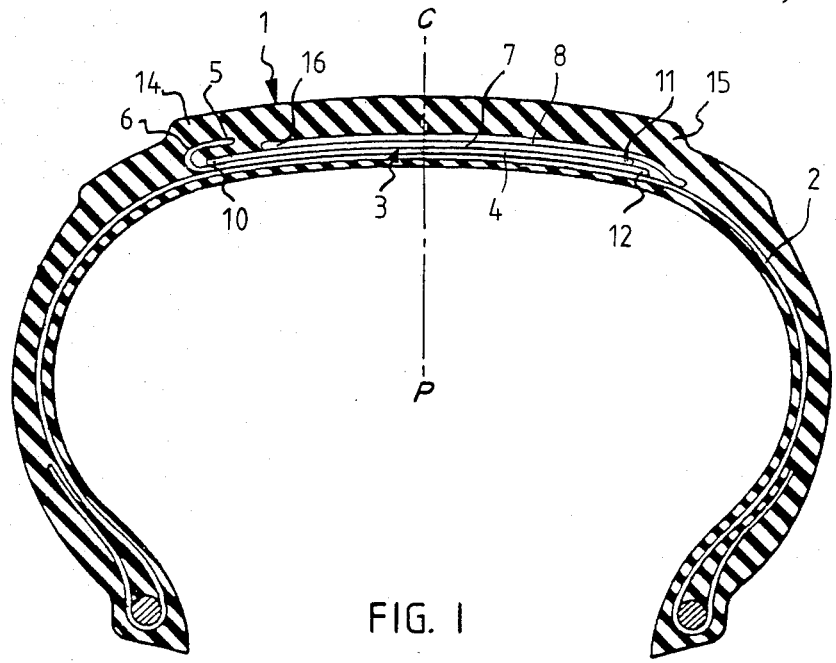

United States Patent [19]

Eveque-Mourroux

[11] Patent Number: 4,522,243
[45] Date of Patent: Jun. 11, 1985

[54] REINFORCING BELT FOR TIRES WITH A RADIAL CARCASS

[75] Inventor: Michel C. Eveque-Mourroux, Diekirch, Luxembourg

[73] Assignee: The Goodyear Tire & Rubber Company, Akron, Ohio

[21] Appl. No.: 585,749

[22] Filed: Mar. 2, 1984

[51] Int. Cl.³ .......................... B60C 9/20; B60C 9/22
[52] U.S. Cl. ................... 152/528; 152/531; 152/536
[58] Field of Search ...... 152/361 R, 361 FP, 361 DM

[56] References Cited

U.S. PATENT DOCUMENTS

| 3,717,190 | 2/1973 | Boileau | 152/361 DM |
|---|---|---|---|
| 3,831,656 | 8/1974 | Senger | 152/361 DM |
| 3,949,797 | 4/1976 | Mirtain et al. | 152/361 FP |
| 3,973,612 | 8/1976 | Mezzanotte | 152/361 FP |
| 4,140,168 | 2/1979 | Caretta | 152/361 FP |
| 4,173,991 | 11/1979 | Mirtain | 152/361 FP |
| 4,183,389 | 1/1980 | Grosch | 152/361 FP |
| 4,184,530 | 1/1980 | Mirtain | 152/361 FP |
| 4,240,488 | 12/1980 | Wilcox | 152/361 FP |
| 4,284,117 | 8/1981 | Poque et al. | 152/359 |
| 4,335,771 | 6/1982 | Reuter | 152/361 FP |

FOREIGN PATENT DOCUMENTS

| 0060210 | 9/1982 | European Pat. Off. | 152/361 FP |
|---|---|---|---|
| 2453892 | 5/1976 | Fed. Rep. of Germany | 152/361 FP |
| 1435170 | 3/1966 | France . | |

Primary Examiner—Lois E. Boland
Attorney, Agent, or Firm—Frank Pincelli

[57] ABSTRACT

An asymmetrical belt for a radial carcass pneumatic tire comprises two steel plies of which one ply is a single cut ply and the other ply is a folded ply comprising a main body portion and a radially outwardly folded portion. The two plies are arranged such that the single cut ply is situated radially outwardly of the folded ply with one end portion lying within the bite formed by the fold of the folded ply. The belt configuration further comprises a textile ply which extends across the median portion and the non enclosed end portion of the single cut ply. The textile ply is preferably composed of parallel cords making an angle of not more than 10° with the mid-circumferential plane of the tire.

7 Claims, 3 Drawing Figures

REINFORCING BELT FOR TIRES WITH A RADIAL CARCASS

DESCRIPTION OF INVENTION

The invention relates to a reinforcing belt structure for pneumatic radial tires, and more particularly to an asymmetrical belt structure comprising one folded belt and one single cut belt.

It is well known in the tire art that asymmetrical belt structures can influence very favorably the riding behaviour of a tire.

This is particularly the case for cars with independent wheel suspension whereby the tires run under a certain camber angle. Different conditions of load result in a change of camber angle. The handling characteristics and the riding comfort of these cars are considerably improved when the change of camber is accompanied by a change of the cornering force. This force can be generated, for example, by an asymmetrical configuration of the belt of the tire.

An asymmetrically belted tire can also be mounted with advantage on a car which does not run under camber. The asymmetrical properties of the tire generate a cornering force which introduces an artificial camber effect on the tire, thereby increasing the stability of the car and producing all the benefits of the camber effect when cornering and when driving at high speed.

According to the present invention, the reinforcing belt comprises two plies of steel cords making opposite angles comprised between 15° and 25° with the circumferential direction of the tire, whereby the innermost ply is a folded ply comprising a main body portion which extends substantially over the whole of the tread width and a radially outwardly folded portion which extends over less than half the tread width, thereby forming a fold in the first shoulder of the tire, and whereby the outermost belt ply extends substantially over the whole of the treadwidth with the first end portion of the outermost ply lying within the bite formed by the fold of the innermost folded ply, whereby the median portion and the second end portion of the outermost ply, situated in the second shoulder of the tire, are covered by at least one layer of textile cords which layer or layers extend not further than the edge of the folded portion of the innermost ply in the direction of the first shoulder of the tire and which layer or layers extend at least up to the edge of the innermost play in the direction of the second shoulder of the tire. The textile layer or layers comprise parallel cords which make an angle with the mid-circumferential plane CP of the tire comprised between 0° and 10°.

In one embodiment of the invention, the belt structure comprises two layers of textile cords which can be two separate layers, but preferably, are formed of one continuous layer which extends two full turns around the circumference of the tire.

In another embodiment of the invention, the belt structure comprises, in addition to the outermost textile layer, a strip of a textile layer placed between the end portions of the belts in the second shoulder of the tire.

Preferably, the cords of the textile layers and the textile strip make a very small angle with the mid-circumferential plane of the tire, the angle being not greater than 10° and preferably being 0°.

Furthermore, it is preferred that the textile cords are made out of a heat shrinkable material. If such a material is used, the shrinkage of the textile cords in the median portion and in the second shoulder portion, can produce a tire with a geometrical conicity. A tire with a small amount of geometrical conicity usually has very good handling characteristics, especially in the case of the instant invention where the conicity is such that the portion of the tire tread that is subjected to the highest pressure in the footprint is that shoulder portion of the tire which contains the fold of the steel ply and which is therefore particularly rigid.

Alternatively, if the textile cords have a relatively high modulus of elasticity, they can be arranged in the crown region of the tire such that they exert a restrictive effect upon the median portion and the second shoulder portion of the inflated tire, thereby producing the desired geometrical conicity of the tire.

Figure 2:
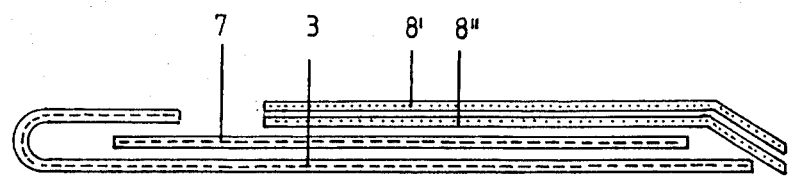
Figure 3:
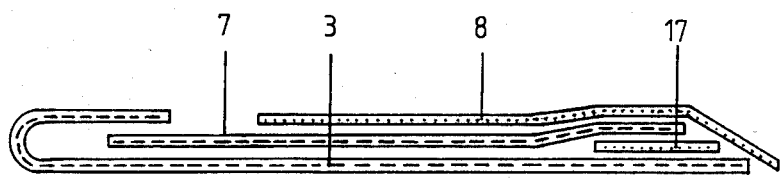

The invention will now be better illustrated with reference to the attached drawings, given by way of example only, in which:

FIG. 1 is a cross sectional view of a pneumatic tire embodying a belt reinforcing structure made in accordance with the present invention and FIG. 2 and FIG. 3 are schematic representations of reinforcing belt constructions incorporating further embodiments of the present invention, the belt construction being broken away from the tire for the purposes of clarity.

Referring now to the drawings, the pneumatic tire is generally indicated by reference number (1). The carcass is preferably of the radial type wherein the cords (2) of the carcass lie at an angle in the range of 70° to 90° with respect to the mid-circumferential centerplane of the tire (1). In the particular embodiment illustrated, the carcass is shown as comprising one ply. However, the carcass may have any desired number of plies. Over the radially outer peripheral region of the carcass is placed a belt structure comprising a first folded ply (3) of steel cords which extends circumferentially about the tire. Folded ply (3) comprises a main body portion (4) and a folded end portion (5) which is folded radially outwardly of the main body portion (4) forming a bite (6). The width of the folded end portion (5) preferably lies in the range of 1/5 to ½ of the width of the main body portion (4). The ply (3), comprises a plurality of reinforcing cords with the cords extending parallel to each other, making an angle comprised between 15° and 25° with the mid-circumferential plane CP of the tire. The main body portion (4) of belt play (3) extends substantially across the width of the ground engaging tread portion of the tire. The bite (6) lies in a first shoulder region (14) and the edge (12) is situated in a second shoulder region (15).

The belt structure further comprises a ply (7) of steel cords which is disposed radially outwardly of the axis of rotation of the tire with respect to ply (3). The ply (7) is what is generally known as a single cut ply and comprises two edges (10) and (11). The lateral edge (10) extends into the bite (6) which is situated in the first shoulder (14) of the tire (1) whereas the lateral edge (11) extends close to the edge (12) of ply (3) situated in the second shoulder (15) of the tire. Preferably, to avoid piled ply endings, whereby edges (12) and (11) of respectively plies (3) and (7) would be contained in the same circumferential plane, the axially outer edge (12) of folded ply (3) extends axially beyond the free edge (11) of ply (7) a distance comprised between 3 and 10 mm.

The ply (7) comprises a plurality of reinforcing cords with the cords extending parallel to each other making an angle comprised between 15° and 25° with the mid-circumferential plane CP of the tire.

The use of two separate steel plies rather than one folded ply with its main body portion and its folded portion extending over substantially the whole width of the tread has several further advantages.

It is well known in the radial tire art that the two steel plies (3, 7) give the tire the required transverse rigidity. Whereas it is customary to use the same cord constructions and the same density of cords in both plies, this need not necessarily be so in the case of the present invention. It may indeed be of advantage to use two different constructions of steel cords for the two plies in order to further enhance the asymmetry of the belt structure.

The asymmetry of the belt structure can also be varied by using different densities of the steel cords in each ply, i.e. by varying the number of cords per unit width of the plies.

The parallel cords of two steel plies (3, 7) can be oriented in such a way that the cords in ply (3) make a different angle with the mid-circumferential plane CP as the cords of the ply (7).

The two steel plies (3, 7) of the reinforcing belt generally comprise steel cords which are embedded into a thin layer of elastomer. In tires incorporating a symmetrical belt structure it is customary to use the same elastomer compound for both belt plies. In the present invention, which aims at providing an asymmetrical belt structure, it may be advantageous to use different elastomers for the two plies, thereby further enhancing the asymmetry of the belt structure.

The belt structure of the present invention will now be further described with reference to FIG. 1.

The belt structure comprises a third ply (8) which is disposed radially outwardly with respect to the axis of rotation of the tire to ply (7).

Ply (8) which, in the longitudinal direction extends about the circumference of the tire, extends across the median portion and the end portion of ply (7) in the axial direction.

Throughout this specification, median portion of ply (7) refers to that portion of ply (7) which extends on either side of the mid-circumferential plane of the tire and which in the axial direction has a width of about a third of the total width of ply (7). The term end portion of ply (7) refers to those portions of ply (7) which terminate at the edges of ply (7) and which in the axial direction have a width which is about a third of the total width of ply (7).

Ply (8) which terminates in edge (16) extends beyond the mid-center plane CP into the half of the tire in which the first shoulder (14) is situated. However, the ply (8) does not extend further than the edge of the folded portion (5) of ply (3). Preferably edge (16) of ply (8) is situated at a small distance from the edge of the folded portion (5) of ply (3), this distance being comprised between 5 and 30% of the width of ply (7).

Ply (8) further extends into the second shoulder (15) of the tire at least up to the edge of the folded ply (3). Preferably ply (8) extends beyond the edge (12) of ply (3), such as shown in FIG. 1. This configuration has the advantage that the cut belt edges (11) and (12) are covered by ply (8) which gives more resistance and protection to these edges.

The cords of ply (8) preferably form a very small angle with the mid-circumferential plane, the angle being not greater than 10° and preferably being 0°.

Further embodiments of the invention will now be described with reference to FIGS. 2 and 3. Like reference numerals in FIGS. 2 and 3 represent the same structures such as previously described in connection with FIG. 1.

In the embodiment of the invention, which is illustrated in FIG. 2, the belt structure comprises two outer textile plies (8') and (8") which can be formed from two separate layers or which preferably are formed of two full turns of a single continuous layer.

In the embodiment of the invention illustrated in FIG. 3, the belt structure of FIG. 1 is further reinforced by means of a textile strip (17) placed between the end portions of the belts in the second shoulder (15) of the tire. This textile strip (17) which gives added strength to the belt structure in the shoulder region, is composed of parallel reinforcing cords making a very small angle with the mid-circumferential plane, the angle being not greater than 10° and preferably being 0°. The width of this strip is comprised between 10 and 30% of the width of ply (7). In FIG. 3 the location of textile strip (17) is illustrated as having its outer lateral edge located in the space which separates the edges of the plies (3) and (8). It is also suitable to place the textile strip (17) such that it projects beyond the edge of ply (3). In this case the outer lateral edge of the strip (17) does not extend further into the second shoulder (15) of the tire than the outer lateral edge of textile layer (8) such that the strip (17) remains covered over its entire width by textile layer (8).

Plies (8, 8', 8" and 17) comprise parallel reinforcing cords of a textile material. Rayon, polyester and nylon are typical examples of textile fibers used in cords for reinforcing elastomeric articles. It is preferred to use textile cords which can shrink under the influence of heat, such as nylon. In the present invention the property of heat shrinkage of the cords can be used with advantage to generate a tire which has a geometrical conicity since the textile cords are only located in the median portion and in one shoulder portion of the tire. It is preferred that the heat shrinkable cords have a shrinkage factor comprised between 2 and 20% of their length.

Alternatively, if the textile cords have a high modulus of elasticity, they can act as a restrictor on the median and the second shoulder portion of the tire. Since the green tires are usually built to a diameter which is smaller than the diameter of the cured tires, the textile cords which have a relatively high modulus of elasticity and which form a very small angle with the mid-circumferential plane have a restrictive effect on the inflated tire. By cords having a relatively high modulus of elasticity are meant cords which have a modulus of elasticity of at least $2 \times 10^{-2}$ Newton/Denier at an elongation of 7%.

It will be understood that the foregoing description of the preferred embodiments of the invention is for purposes of illustration only and that a number of changes and modifications can be brought to the embodiments without departure from the scope and spirit of the present invention as defined in the appended claims.

I claim:

1. A reinforcing belt for pneumatic tires comprising two plies of steel cords oriented at opposite angles of between 15° and 25° with the mid-circumferential plane of the tire, whereby the radially innermost ply of steel cords is a folded ply comprising a main body portion which extends substantially over the whole tread width and having only a single folded portion, said single folded portion being folded radially outwardly and extending over less than half the tread width thereby forming a fold in a first shoulder of the tire, and whereby the radially outermost ply of steel cords is unfolded and has a median portion and two end portions, the radially outermost ply of steel cords extends substantially over the whole of the tread width and has its first end portion lying within a bite formed by the fold of the radially innermost ply of steel cords and its second end portion situated in a second shoulder of the tire, whereby the median portion and second end portion of the radially outermost ply of steel cords have disposed radially outwardly thereof at least one layer of textile cords which layer or layers extend axially no further than the edge of the folded portion of the radially innermost ply of steel cords in the direction of the first shoulder of the tire and which layer or layers extend at least up to the edge of the radially innermost ply of steel cords in the direction of the second shoulder of the tire and whereby the textile layer or layers comprise parallel cords which make an angle with the mid-circumferential plane of the tire of between 0° and 10°.

2. A reinforcing belt for pneumatic tires according to claim 1 whereby the median portion and the second end portion of the radially outermost ply of steel cords are covered by two layers of textile cords.

3. A reinforcing belt for pneumatic tires according to claim 2 whereby the two layers of textile cords are formed by two full turns around the circumference of the tire of one continuous layer.

4. A reinforcing belt for pneumatic tires according to claim 1 further comprising a textile strip radially interposed between the end portions of the two plies of steel cords in the second shoulder of the tire.

5. A reinforcing belt for pneumatic tires according to claim 4 whereby the textile strip comprises parallel cords which make an angle with the mid-circumferential plane of the tire of between 0° and 10°.

6. A reinforcing belt for pneumatic tires according to claim 4 characterized in that the layer of textile cords comprises cords which have a heat shrinkage factor of between 2 and 20% of their length.

7. A reinforcing belt for pneumatic tires according to claim 6 characterized in that the textile strip comprises cords which have a heat shrinkage factor of between 2 and 20% of their length.

* * * * *

UNITED STATES PATENT OFFICE
CERTIFICATE OF CORRECTION

PATENT NO. : 4,522,243
DATED : June 11, 1985
INVENTOR(S) : Michel C. Eveque-Mourroux It is certified that error appears in the above-identified patent and that said Letters Patent are hereby corrected as shown below:

Column 1, line 50 - "play" should be --ply--

Column 2, line 49 - "play" should be --ply--

Signed and Sealed this

First Day of October 1985

[SEAL]

Attest:

DONALD J. QUIGG

Attesting Officer

Commissioner of Patents and Trademarks—Designate